A. HALL.
FISH TRAP.
APPLICATION FILED DEC. 30, 1912.
1,088,222.
Patented Feb. 24, 1914.
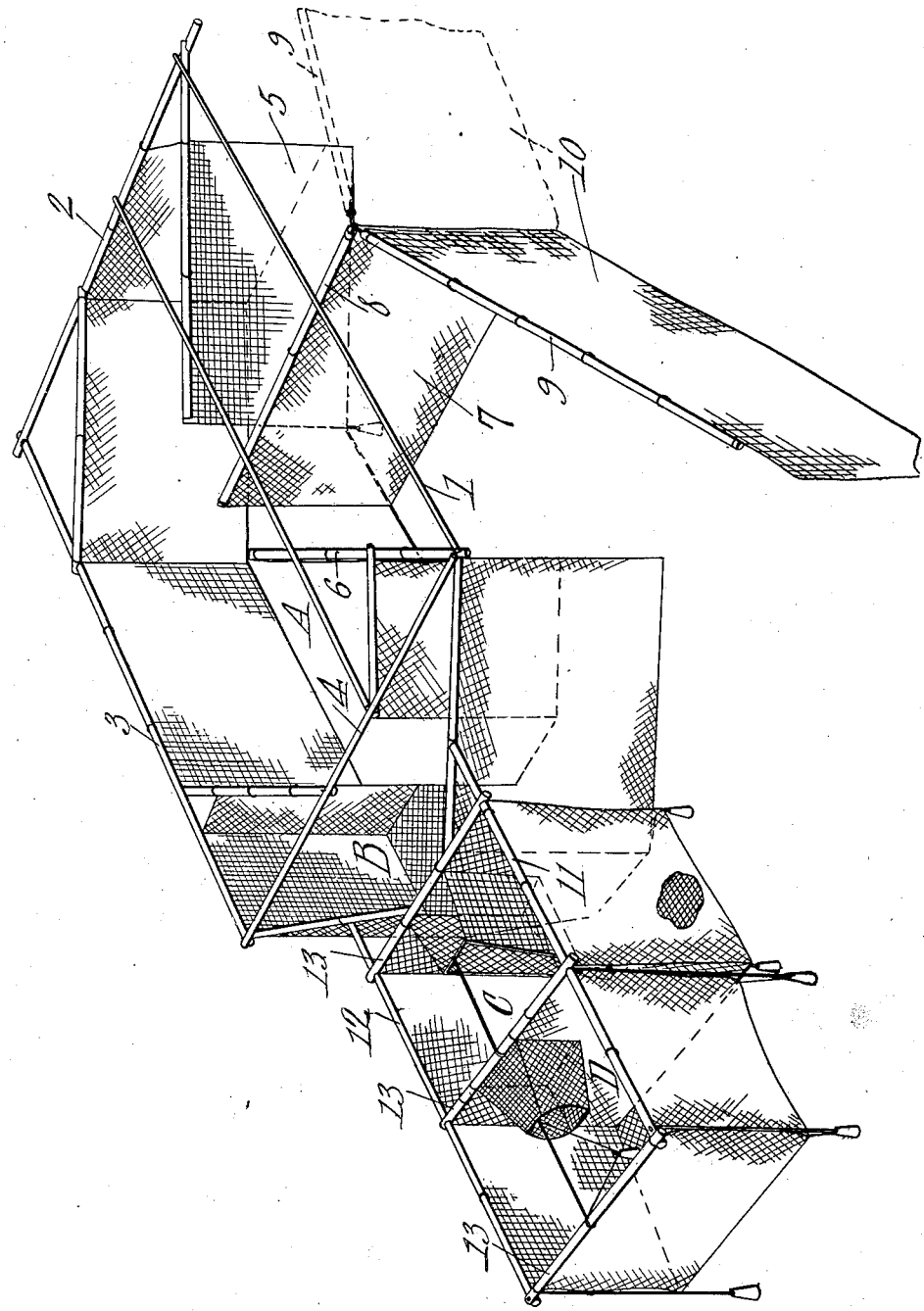
Witnesses
Adolph Hall, Inventor
by C. A. Snow & Co.
Attorneys

UNITED STATES PATENT OFFICE.

ADOLPH HALL, OF SOUTH BEND, WASHINGTON.

FISH-TRAP.

1,088,222. Specification of Letters Patent. Patented Feb. 24, 1914.

Application filed December 30, 1912. Serial No. 739,389.

*To all whom it may concern:*

Be it known that I, ADOLPH HALL, a citizen of the United States, residing at South Bend, in the county of Pacific and State of Washington, have invented a new and useful Fish-Trap, of which the following is a specification.

This invention relates to fish traps and more particularly to one which is adapted to float with the net portion thereof anchored by suitable weights.

An object of the present invention is to provide a fish trap which may be used where it is impossible or undesirable to anchor the same by piling or similar structures.

Another object is to provide means whereby the fish swimming in opposite directions to the tide will be guided within the said fish trap.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which the figure represents a view in perspective of my improved fish trap.

Referring to the figure in which similar reference numerals designate corresponding parts, A represents the main inclosure and B, C, D, the more limited closures communicating therewith.

The fish trap is designed to float upon the surface of the water with the net portion thereof extending downwardly therefrom, and held in that position by means of suitable weights. To this end the compartment A is formed of a framework of logs or piling 1, 2, 3 and 4. The net portion depends from these logs or suitable cross struts 14 connected thereto.

One side wall of the main compartment A is provided with the approximately diagonally extending entrance walls 5 and 6. Located approximately centrally of the side 1 is the transverse guide wall 7 suitably suspended from a beam 8. The side walls 5 and 6 terminate a distance from the guide wall 7 so as to allow a suitable opening for the entrance of fish therein. The beam 8 preferably extends a distance beyond the ends of the main compartment frame and to the outer extremity thereof is hingedly connected the boom member 9 to which is secured the depending net wall 10. The boom 9 is adapted to swing about the beam 8 as illustrated in dotted lines in the drawing. By extending the beam 8 beyond the ends of the compartment frame it allows the boom 9 to swing into a position parallel to the longitudinal axis of the trap and at the same time maintain a sufficient opening for the entrance of the fish into the main compartment A.

The compartments B, C and D communicate with the main compartment A and are provided with the usual decreasing inlet openings so that the fish having once reached the compartment D they will be suitably trapped therein. The compartments B, C and D are provided with the upper longitudinal beams 11 and 12 and the cross members 13. The beams or logs are all rigidly secured together in order to provide a rigid structure. It is to be understood in this connection that the number of compartments is purely arbitrary and may be varied according to circumstances.

The side walls of the fish trap are weighed down and held in position thereby. The entire frame is composed of wood or other buoyant material so that the trap floats and may be readily towed about and its position changed. The boom 9 is buoyant and pivotally connected to the beam 8.

The fish trap is intended to be positioned with its major axis parallel to the flow of the stream in which the fish trap is placed and as it is well known that the fish swim against the current, the boom will swing into such position that the fish will encounter the end wall 10 and be directed thereby into the main compartment of the fish trap and therefore suitably encaged. From the foregoing it will be apparent that the boom 9 is adapted to change its position according to the direction in which the tide is flowing and therefore will always be in an operative position. In some special instances, the boom is adapted to be held in alinement with the beam 8 by securing said boom to the shore or other similar structure.

Having thus fully disclosed the construction and operation of my improved fish trap, what I claim to be new and original with me is:—

A fish trap comprising an elongated buoyant frame, compartment defining nets depending therefrom, the said buoyant frame adapted to swing to a position with the longitudinal axis thereof substantially parallel to the flow of the current, one of said compartments provided with a lateral entrance, a guide wall rigidly secured in front of said entrance and extending transversely of and for a distance beyond said frame, and a buoyant boom pivotally secured to the outer extremity of said guide wall and adapted to swing freely into alinement with the stream current, and a net depending from said boom and secured thereto.

In testimony that I claim the foregoing as my own, I have hereto affixed my signature in the presence of two witnesses.

ADOLPH HALL.

Witnesses:
B. F. ARMSTRONG,
A. P. LEONARD.

Copies of this patent may be obtained for five cents each, by addressing the "Commissioner of Patents, Washington, D. C."